United States Patent [19]

Zwick et al.

[11] Patent Number: 5,707,130

[45] Date of Patent: Jan. 13, 1998

[54] TAILLIGHT FOR VEHICLES, ESPECIALLY FOR MOTOR VEHICLES

[75] Inventors: Hubert Zwick, Stuttgart; Otto Müller, Mühlhausen; Stephan Berlitz, Aichach, all of Germany

[73] Assignee: Reitter & Schefenacker GmbH & Co. KG, Esslingen, Germany

[21] Appl. No.: 771,222

[22] Filed: Dec. 20, 1996

[30] Foreign Application Priority Data

Dec. 21, 1995 [DE] Germany ............. 195 47 861.4

[51] Int. Cl.⁶ ............................................. F21J 7/04
[52] U.S. Cl. ........................ 362/31; 362/32; 362/61
[58] Field of Search ..................... 362/31, 32, 61

[56] References Cited

U.S. PATENT DOCUMENTS

| | | | |
|---|---|---|---|
| 4,949,226 | 8/1990 | Makita et al. | 362/61 |
| 5,287,101 | 2/1994 | Serizawa | 362/61 |

*Primary Examiner*—Carroll B. Dority
*Attorney, Agent, or Firm*—Robert W. Becker & Associates

[57] ABSTRACT

A vehicle taillight has a housing and a light-transmissive cover for closing off the housing. At least one light source is located within the housing for emitting light through the light-transmissive cover. At least one light-guiding member is positioned within the housing between the light source and the light-transmissive cover. The light-guiding member consists of light guide material and reflects light emitted by the light source onto the light-transmissive cover.

18 Claims, 3 Drawing Sheets

TAILLIGHT FOR VEHICLES, ESPECIALLY FOR MOTOR VEHICLES

BACKGROUND OF THE INVENTION

The invention relates to a taillight for vehicles, preferably for motor vehicles, having a housing in which at least one light source is arranged which is positioned behind a light-transmissive cover.

Known taillights of this kind have as a light source an incandescent light bulb whose light beams are reflected by a reflector onto the light-transmissive cover. Due to the incandescent light bulb, the taillight has a relatively great depth so that correspondingly large mounting spaces within the vehicle must be provided. It is technically very difficult to uniformly illuminate the light-transmissive cover of such taillights.

It is therefore an object of the present invention to embody a taillight of the aforementioned kind such that for a construction with minimal depth a uniform illumination over a large surface area of the light-transmissive cover is possible.

SUMMARY OF THE INVENTION

The vehicle taillight according to the present invention is primarily characterized by:

A housing;

A light-transmissive cover for closing the housing;

At least one light source located within the housing for emitting light through the light-transmissive cover;

At least one light-guiding member positioned within the housing between the light source and the light-transmissive cover;

The light-guiding member comprised of light guide material;

The light-guiding member reflecting light emitted by the light source onto the light-transmissive cover.

Preferably, the at least one light-guiding member comprises a plate having at least one projection extending perpendicularly to an end face of the plate toward the at least one light source.

The at least one projection is centrally arranged at the end face.

The at least one projection preferably tapers toward the at least one light source.

Advantageously, the at least one projection tapers continuously toward the at least one light source.

The at least one projection has preferably a circular cross-section.

Advantageously, the at least one projection and the at least one light-guiding member form a unitary part.

Preferably, the plate has a circular contour.

The at least one light-guiding member has at least one reflective surface for reflecting light emitted by the light source.

The at least one light-guiding member preferably comprises a plate having at least one projection extending perpendicular to a first end face of the plate toward the at least one light source. The plate has a second end face opposite the first end face. A first one of the reflective surfaces is provided at the second end face.

The second end face preferably has a depression with a wall surface that forms the first reflective surface.

The depression may have a circular contour or may extend linearly.

The depression has a depth that is smaller than the thickness of the plate.

The first end face of the plate has second reflective surfaces. The first end face has recesses with recess walls that form the second reflective surfaces. The second reflective surfaces are located within the path of light by the first reflective surface.

The second reflective surfaces reflect light toward the light-transmissive cover.

The at least one light source is preferably an LED.

In the inventive taillight the light-guiding member is positioned within the path of light emitted by the light source onto the light-transmissive cover of the housing. The light-guiding member is comprised of light guide material and guides the light emitted by the light source in an excellent manner. Advantageously, the light source is an LED that has only a minimal height and that heats up only minimally during operation. The light emitted by the LED is optimally distributed and reflected by the light-guiding member onto the light-transmissive cover. The light-transmissive cover can therefore be illuminated uniformly and over a large surface area. Due to the light-guiding member the inventive taillight can have a very flat construction so that for its mounting within the vehicle only a correspondingly small receiving or mounting chamber is required.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
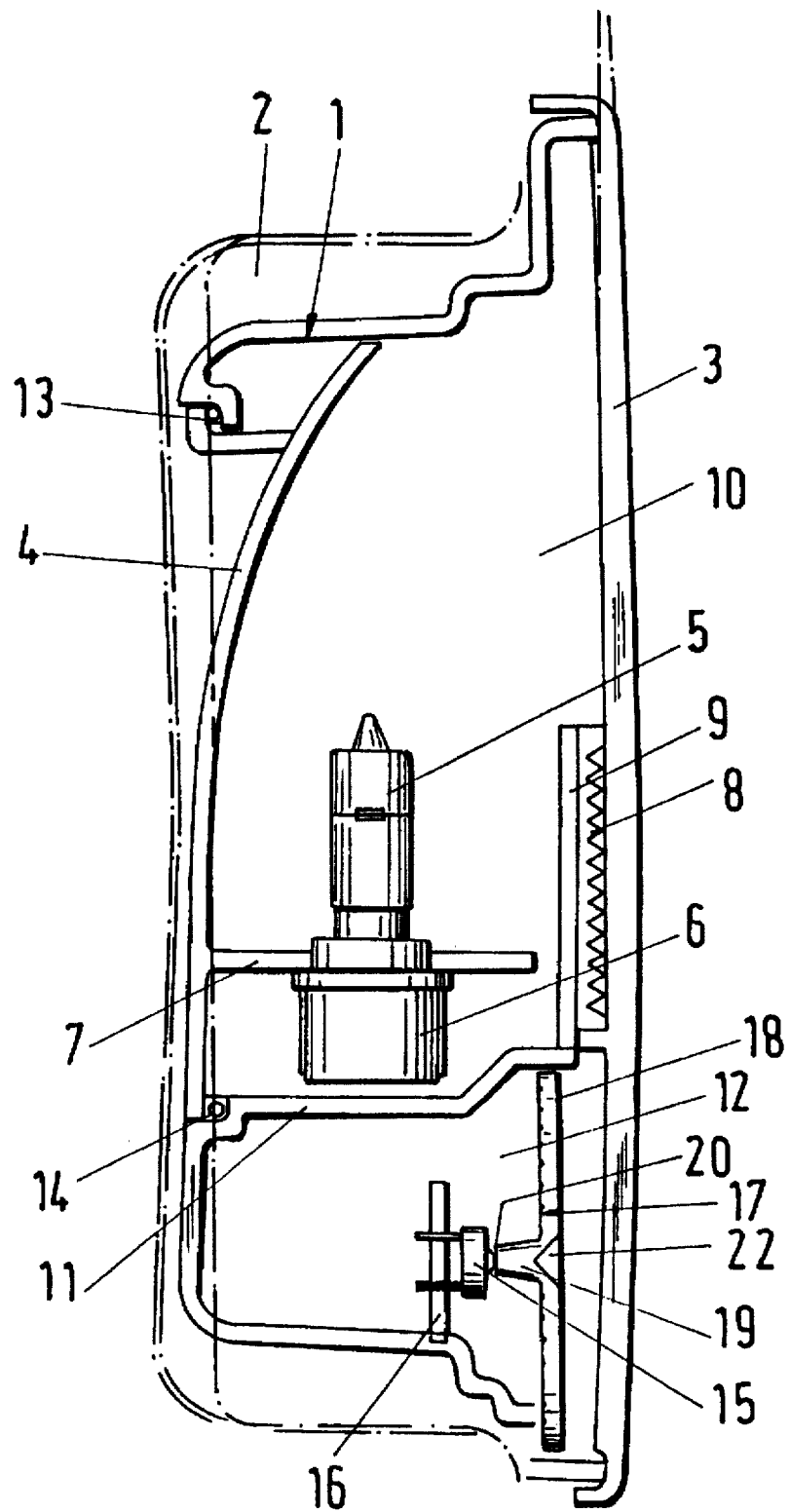
FIG. 1 shows a cross-section of the inventive taillight of a vehicle.

The present invention will now be described in detail with the aid of a specific embodiment utilizing FIGS. 1 through 3.

The taillight has a housing 1 that is inserted and mounted within a receiving chamber 2 of a motor vehicle in a manner known per se. The housing 1 is open at one side which is closed off by a light-transmissive cover 3. At the backside of the housing 1 a reflector 4 for an incandescent light bulb 5 is provided. The light bulb 5 is positioned in a socket 6 mounted on a wall 7 that extends from the reflector 4 toward the light-transmissive cover 3. In the mounted position of the taillight, the wall 7 extends horizontally. A portion of the light emitted by the incandescent light bulb 5 impinges directly on the light-transmissive cover 3 and exits directly therethrough to the exterior. Another portion of the light is reflected by the reflector 4 in a manner known per se onto the light-transmissive cover 3.

At the level of the incandescent light bulb 5 a rear reflector 8 is connected to the backside of the light-transmissive cover 3 within the housing 1. It is embodied in a manner known per se and may be colored, for example, may be red. The rear reflector 8 can be mounted in a manner known per se to the light-transmissive cover 3. At the side facing the incandescent light bulb 5, the rear reflector 8 is provided with a light-blocking cover 9 so that the light emitted by the incandescent light bulb 5 cannot pass through the rear reflector 8 and thus exit from the taillight.

The incandescent light bulb 5 is positioned within a chamber 10 that is separated by a partition 11 from a further chamber 12 arranged below. The partition 11 is advantageously a unitary part of the housing 1. The reflector 4 is a component separate from of the housing 1 and is inserted from the back of the taillight into an opening 13 of the housing 1. It is fastened in a manner known per se by interposing at least one seal 14.

The chamber 12 in the mounted position of the taillight is below the chamber 10. As shown in FIG. 1, the lower chamber 12 has a substantially smaller height than the upper chamber 10. In the lower chamber 12 at least one light source 15 in the form of an LED is provided. Advantageously, a plurality of LEDs 15 are arranged spaced from one another in the horizontal direction on a circuit board 16 that is positioned on edge. The circuit board 16 is preferably connected to the inner wall of the housing 1. Between the LEDs 15 and the light-transmissive cover 3 a number of light-guiding members 17, their member corresponding to the number of LEDs 15, are positioned. They are comprised of light guide material that is preferably a plastic material. Such light guide materials are known per se. The light-guiding member 17 has a circular plate 18 which is positioned at a distance behind the light-transmissive cover 3 in the lower chamber 12. The plate 18 extends substantially over the entire height of the chamber 12 and has advantageously a constant thickness. At the underside facing away from the light-transmissive cover 3, the plate 18 is provided with a projection 19 which tapers in the direction toward the LEDs 15. As can be seen in FIGS. 1 and 3, the projection 19 rests with a planar underside 20 at the LED 15. The projection 19 has a circular cross-section. In the area adjacent to the projection 19, the underside of the plate 18 is provided with spaced-apart reflection prisms 21 (FIG. 3) on which the light beams emitted by the LED 15 are reflected in a manner which will be described in the following. The reflection prisms 21 are formed by recess walls of substantially circular recesses at the underside (end face) of the plate 18. These recesses are distributed uniformly in the area between the projection 19 and the periphery of the plate 18. At the end face of the plate 18 facing the light-transmissive cover 3 a substantially circular depression 22 is provided at the level of the projection 19. The depression 22 is embodied such that the light beams emitted by the LED 15 impinge on a first reflective surface 23 which is formed by the wall surface of the depression 22. The first reflective surface 23 is a conical surface and advantageously metal-coated. As shown in FIG. 3, the depression 22 extends into the vicinity of the projection 19 and is arranged concentrically to the projection 19. The first reflective surface 23 forms an oblique angle with the end face of the plate 18 facing the light-transmissive cover 3.

Figure 3:
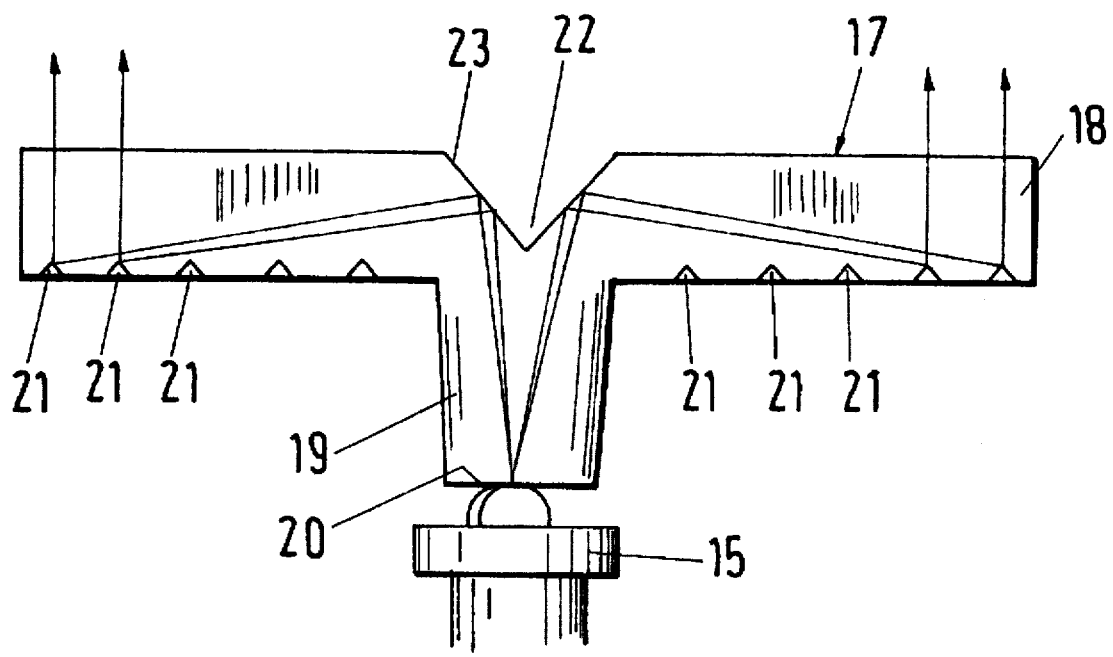
FIG. 3 shows a light-guiding member of the inventive taillight in an enlarged representation.

FIG. 3 shows the path of the light beams. The light emitted by the LED 15 impinges, at the planar underside 20, on the projection 19 and thus on the first reflective surface 23. On this reflective surface 23 the light beams are reflected toward the reflection prisms 21. These reflection prisms 21 have second conical reflective surfaces on which the light beams are reflected onto the upper side of the plate 18. The light beams exit here from the plate 18 and pass through the light-transmissive cover 3 to the exterior of the housing 1. The light beams emitted by the LED 15 diverge so that the individual light beams are reflected at different angles on the reflective surface 23. The reflection prisms 21 are arranged such that the reflected light beams coming from the first reflective surface 23 impinge thereon and are reflected toward the upper side of the plate 18, respectively, toward the light-transmissive cover 3. In this manner it is ensured that the light emitted by the LED 15 uniformly impinges across the entire surface area of the plate 18.

Since the plate 18 of the light-guiding member 17 is thin and since the projection 19 only has a minimal height, a taillight of a very flat construction is provided that requires only a minimal mounting space. The disclosed embodiment of the light-guiding member 17 provides a large, uniformly illuminated surface area for which only a few LEDs are required. Thus, the taillight can be manufactured at low costs.

The reflection prisms 21 are advantageously formed by the recess walls of the recesses which are provided at the underside (end face) of the plate 18. The second reflective surfaces are also metal-coated. It is also possible to embody the underside of the plate 18 such that, instead of the reflective recesses 21, the underside of the plate 18 is designed such that total reflection of the beams reflected by the reflective surface 23 takes place.

Instead of the LEDs as light sources 15 it is of course, also possible to use other suitable light sources with similar light-emitting behavior. The LEDs 15 have the advantage that they cause only minimal heating. The LEDs are also very responsive which is especially important in applications as brake lights and turn signal lights. Furthermore, the use of a plurality of LEDs has the advantage that a total failure of the corresponding taillight cannot occur. When one of the LEDs 15 is inoperative, the other LEDs are still working.

Figure 2:
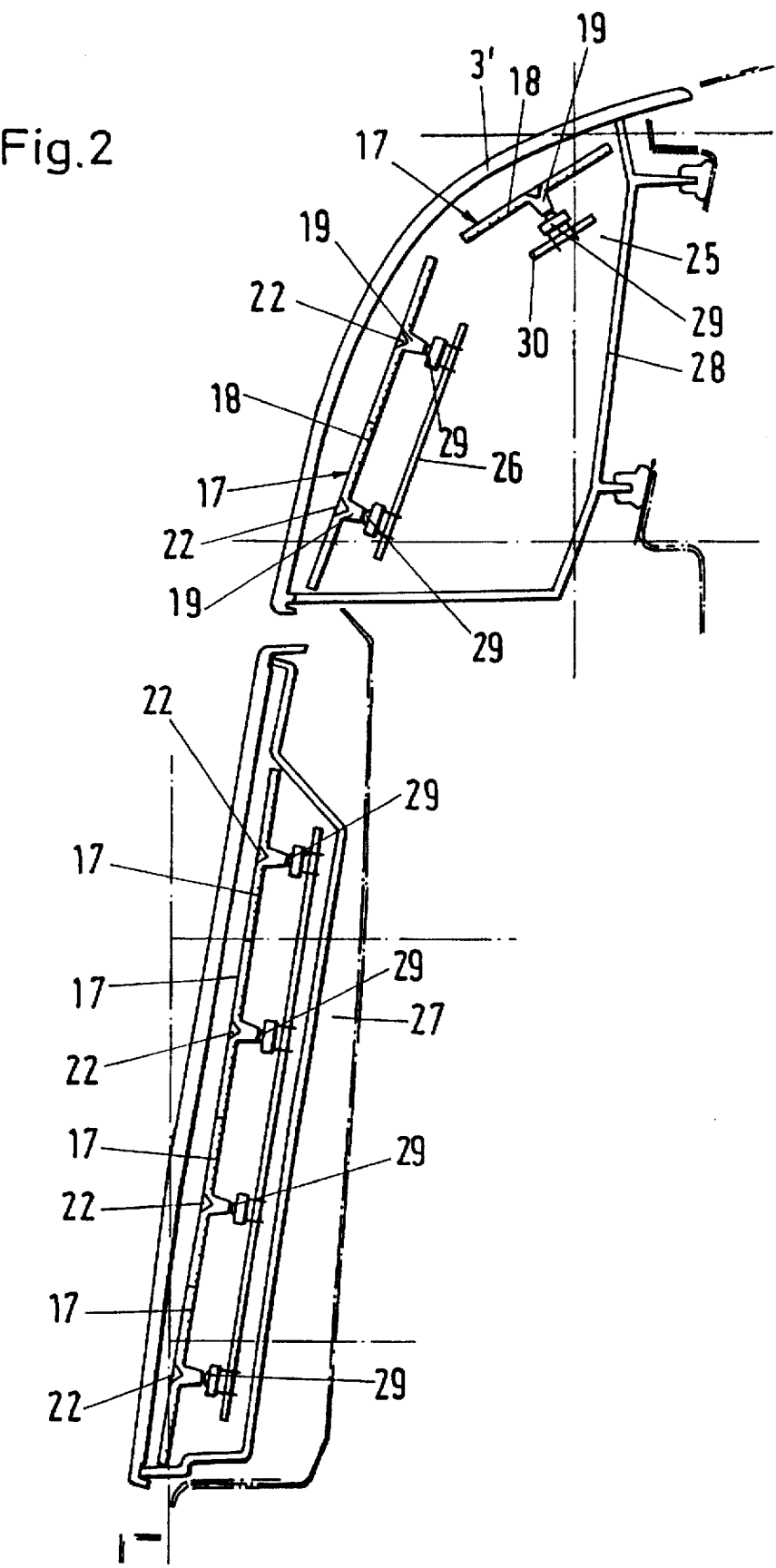
FIG. 2 is a longitudinal section of the inventive taillight of a motor vehicle.

FIG. 2 shows the complete taillight of the motor vehicle with a turn signal 25, a rear light 26 and a brake light 27. All three lights are of a construction similar to the one explained in connection with FIG. 1. The turn signal light 25 and the rear light 26 are housed in a housing 28 that, in a manner known per se, is fastened within the mounting space of the motor vehicle. The turn signal light 25 has a light source 29, preferably an LED provided on a circuit board 30. The circuit board 30 is connected in a suitable manner within the housing 28. At the light source 29 the projection 19 of the light-guiding member 17 rests, as has been explained in connection with FIGS. 1 and 3. The light emitted by the LED 29 is reflected in the aforedescribed manner by the light-guiding member 17 onto the light-transmissive cover 3'.

It is, of course, possible to use for the turn signal light 25 a plurality of LEDs 29 or other suitable light sources. When only one LED 29 is provided, only one light-guiding member 17 with projection 19 is provided. For a plurality of LEDs 29 a corresponding number of light-guiding members 17 are present.

For the rear light 26, two light-guiding members 17 with projections 19 are provided which abut one another. These light-guiding members 17 are of the same construction as disclosed in the embodiment according to FIGS. 1 and 3.

For the brake light 27 in the shown embodiment four light-guiding members 17 are provided which abut one another. Each one is embodied corresponding to FIGS. 1 and 3. Each light-guiding member 17 has coordinated therewith, as disclosed above, a light source 29, preferably an LED. Instead of using four light-guiding members 17 it is also possible to use a correspondingly long light-guiding member which has, for example, a rectangular contour. Instead of the individual recesses 22, this light-guiding member may have continuous depressions extending over its length. The light-guiding member 17 of the other lights 25, 26 can also be embodied similarly in an elongate/rectangular shape.

The present invention is, of course, in no way restricted to the specific disclosure of the specification and drawings, but also encompasses any modifications within the scope of the appended claims.

What we claim is:

1. A vehicle taillight comprising:

a housing;

a light-transmissive cover for closing said housing;

at least one light source located within said housing for emitting light through said light-transmissive cover;

at least one light-guiding member including a plate having at least one projection extending perpendicular to said plate and having a planar end surface adjacent said at least one light source and being positioned within said housing between said light source and said light-transmissive cover;

said light-guiding member comprised of light guide material;

said light-guiding member reflecting light emitted by said light source onto said light-transmissive cover.

2. A vehicle taillight according to claim 1, wherein said at least one projection is centrally arranged on said plate.

3. A vehicle taillight according to claim 1, wherein said at least one projection tapers toward said at least one light source.

4. A vehicle taillight according to claim 1, wherein said at least one projection tapers continuously toward said at least one light source.

5. A vehicle taillight according to claim 1, wherein said at least one projection has a circular cross-section.

6. A vehicle taillight according to claim 1, wherein said at least one projection and said at least one light-guiding member form a unitary part.

7. A vehicle taillight according to claim 1, wherein said plate has a circular contour.

8. A vehicle taillight according to claim 1, wherein said at least one light-guiding member has at least one reflective surface for reflecting light emitted by said light source.

9. A vehicle taillight according to claim 8, wherein:

a first reflective surface is provide on a side of said plate opposite said at least one projection.

10. A vehicle taillight according to claim 9, wherein said second end face has a depression with a wall surface, said wall surface forming said first reflective surface.

11. A vehicle taillight according to claim 10, wherein said depression has a circular contour.

12. A vehicle taillight according to claim 10, wherein said depression extends linearly.

13. A vehicle taillight according to claim 10, wherein said depression has a depth that is smaller than a thickness of said plate.

14. A vehicle taillight according to claim 9, wherein first said plate has at least a second reflective surface on a side common to said projection.

15. A vehicle taillight according to claim 14, wherein said at least a second reflective surface is formed by one or more recesses with recess walls, said recess walls forming said second reflective surfaces.

16. A vehicle taillight according to claim 14, wherein said second reflective surfaces are located within a path of light reflected by said first reflective surface.

17. A vehicle taillight according to claim 14, wherein said at least second reflective surface reflect light toward said light-transmissive cover.

18. A vehicle taillight according to claim 1, wherein said at least one light source is an LED.

* * * * *